(12) United States Patent
Smith et al.

(10) Patent No.: US 9,457,734 B2
(45) Date of Patent: Oct. 4, 2016

(54) CONTINUOUSLY ADAPTIVE FASTENER CLIP

(75) Inventors: Michael Walter Smith, Lake Zurich, IL (US); Daniel James Dickenson, Libertyville, IL (US)

(73) Assignee: TERMAX CORPORATION, Lake Zurich, IL (US)

( * ) Notice: Subject to any disclaimer, the term of this patent is extended or adjusted under 35 U.S.C. 154(b) by 874 days.

(21) Appl. No.: 12/534,119

(22) Filed: Aug. 1, 2009

(65) Prior Publication Data

US 2010/0026028 A1 Feb. 4, 2010

Related U.S. Application Data

(60) Continuation-in-part of application No. 11/870,412, filed on Oct. 10, 2007, now Pat. No. 8,950,042, which is a continuation-in-part of application No. 11/277,107, filed on Mar. 21, 2006, now Pat. No.

(Continued)

(51) Int. Cl.
| | |
|---|---|
| *A44B 99/00* | (2010.01) |
| *B60R 13/02* | (2006.01) |
| *B60R 13/04* | (2006.01) |
| *F16B 21/07* | (2006.01) |
| *F16B 37/04* | (2006.01) |
| *F16B 5/02* | (2006.01) |

(52) U.S. Cl.
CPC .......... *B60R 13/0206* (2013.01); *B60R 13/04* (2013.01); *F16B 21/075* (2013.01); *F16B 37/043* (2013.01); *F16B 5/02* (2013.01); *Y10T 24/307* (2015.01); *Y10T 24/44026* (2015.01)

(58) Field of Classification Search
CPC .............. B60R 13/0206; B60R 13/04; Y10T 24/44026; F16B 5/02; F16B 21/075; F16B 37/043

USPC ........ 24/297, 453, 289–295; 296/97.9, 97.12, 296/146.7, 39.1, 214; 411/45–48, 182, 480, 411/533, 173–175, 508–511; 52/716.7, 52/718.06, 716.5, 716.6, 716.8, 718.03, 52/704; 403/291, 297, 315, 327, 329, 375, 403/379.6, DIG. 14, 397

See application file for complete search history.

(56) References Cited

U.S. PATENT DOCUMENTS

| | | | | |
|---|---|---|---|---|
| 5,129,768 | A * | 7/1992 | Hoyle et al. .................. | 411/182 |
| 5,263,233 | A * | 11/1993 | Kim et al. ...................... | 24/295 |
| 6,141,837 | A * | 11/2000 | Wisniewski .................... | 24/295 |
| 6,453,522 | B1 * | 9/2002 | Romero Magarino et al. ............................... | 24/458 |
| 6,517,302 | B2 * | 2/2003 | Lee ............................... | 411/182 |
| 6,629,809 | B2 * | 10/2003 | Vassiliou ....................... | 411/173 |
| 6,644,713 | B2 * | 11/2003 | Del Pozo Abejon et al. ............................ | 296/39.1 |
| 6,976,292 | B2 * | 12/2005 | MacPherson et al. .......... | 24/293 |

(Continued)

FOREIGN PATENT DOCUMENTS

WO    WO 9848179 A1 * 10/1998

*Primary Examiner* — Robert J Sandy
*Assistant Examiner* — Michael Lee

(57) ABSTRACT

A fastener clip includes a base plate and a first and second pair of laterally offset legs extending from the base plate. At least one first wing extends from the first pair of laterally offset legs. The at least one first wing has an engagement region. At least one second wing extends from the second pair of laterally offset legs. The at least one second wing also has an engagement region. The engagement regions include a depressed portion operable to adapt to variations or movement of a slot.

22 Claims, 16 Drawing Sheets

Related U.S. Application Data 8,627,552, which is a continuation-in-part of application No. 10/704,094, filed on Nov. 7, 2003, now abandoned, which is a continuation-in-part of application No. 10/906,209, filed on Feb. 9, 2005, now Pat. No. 7,178,850, said application No. 10/704,094 is a division of application No. 10/164,963, filed on Jun. 7, 2002, now Pat. No. 6,718,599.

(60) Provisional application No. 60/301,364, filed on Jun. 25, 2001, provisional application No. 60/327,815, filed on Oct. 9, 2001, provisional application No. 60/353,515, filed on Feb. 1, 2002.

(56) References Cited

U.S. PATENT DOCUMENTS

| | | | | |
|---|---|---|---|---|
| 2001/0032377 | A1* | 10/2001 | Lubera et al. | 24/293 |
| 2002/0100146 | A1* | 8/2002 | Ko | 24/295 |
| 2002/0167187 | A1* | 11/2002 | Murar | 296/39.1 |
| 2005/0236861 | A1* | 10/2005 | Slobodecki et al. | 296/39.1 |
| 2006/0117535 | A1* | 6/2006 | Fraser et al. | 24/289 |

* cited by examiner

ND ADAPTIVE FASTENER
CONTINUOUSLY ADAPTIVE FASTENER CLIP

RELATED APPLICATIONS

This is a continuation in part application claiming priority from an application entitled "CONTINUOUSLY ADAPTIVE FASTENER CLIP" having a Ser. No. 11/870,412, having a filing date of Oct. 10, 2007, which is a continuation in part application claiming priority from an application entitled "Multicontact Adaptive Fastener Clip" having a Ser. No. 11/277,107, having a filing date of Mar. 21, 2006, which is a continuation in part of U.S. patent application Ser. No. 10/906,209, now U.S. Pat. No. 7,178,850, filed on Feb. 9, 2005, the entire disclosure of which is incorporated herein by reference all of which are incorporated herein by reference in their entirety. Patent application entitled "Multicontact Adaptive Fastener Clip" having a Ser. No. 11/277,107, and a filing data of Mar. 21, 2006, is a continuation in part of U.S. patent application Ser. No. 10/704,094, filed Nov. 7, 2003, now abandoned, entitled, "Vehicle Comprising Assemblies Having Fastener with Ergonomically Balanced Removal to Insertion Force Ratio", which is a divisional Application of non-provisional application Ser. No. 10/164,963, filed Jun. 7, 2002, now U.S. Pat. No. 6,718,599, which claims priority to provisional applications 60/301,364, filed Jun. 25, 2001, 60/327,815, filed Oct. 9, 2001, and 60/353,515 filed Feb. 1, 2002.

FIELD OF THE INVENTION

The invention relates generally to devices for fastening objects, and more particularly to a fastener clip for insertion into an engagement structure, such as a vehicle chassis, a hollow substrate, a wall, a plate or any suitable surface.

BACKGROUND OF THE INVENTION

A number of devices and fasteners are currently available for fastening panels, such as body panels and automobile interior trim piece panels, to the chassis of a vehicle. As used herein, a body panel refers to, for example, any interior or exterior body panel on a vehicle, a plastic interior trim piece, headliner or any interior trim piece. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

These body panels typically are required to attach to the chassis of an automobile with a relatively low level of insertion force while providing a high level of extraction force suitable to maintain attachment of the panel to the chassis. However, these conventional fastener devices instead provide approximately relatively equal levels of insertion and extraction force. Further, conventional fasteners typically do not adequately secure the panel to the vehicle chassis having sheet metal with different curvature or thicknesses throughout. Also, conventional fasteners are not suitable under a variety of environmental conditions, such as in the presence of vibration at various levels of amplitude and frequency. For example, the fastener device should prevent or minimize the amount of buzzing, rattling or any other type of noise that may cause attention to the occupants of the vehicle or otherwise weaken the attachment. Also, conventional fasteners do not adequately accommodate various levels of production tolerances, such as various dimensions amongst, for example, the body panels as well as the vehicle chassis. Thus, conventional fastener devices typically do not adequately fasten to a range of sheet metal thicknesses and do not minimize or eliminate buzzing and rattling and do not sufficiently accommodate variations in production tolerances.

Fastener clips, such as metal spring fasteners, are known for attaching body panels to an automobile chassis. For example, fastener clips are known having a base plate and four stepped arms extending from the base plate. Each stepped arm includes four incremental steps (stair-steps) suitable for engaging a slot in a vehicle chassis with one of the steps on each arm. The incremental steps allow for engagement, however, in only one of the four discrete step positions rather than over a continuous range of engagement positions. Further, each step has a relatively large rise and run so that, once inserted, movement of the fastener clip within the range of a step size may occur, resulting in wear and/or the generation of noise, including buzzing and rattling as a result of vibrations occurring within the vehicle. Also, the steps typically cut onto each arm during manufacture and also require twisting of each wing on the fastener clip in order to engage the slot in the vehicle chassis. As a result, only an edge or a portion of an edge of each of the steps engages the hole in the vehicle slot.

If the sheet metal varies in thickness or if tolerances in production of the slot in the vehicle chassis or in the trim-piece exist, for example, then engagement of one portion of the hole in the chassis with one of the arms may not provide suitable frictional engagement or otherwise result in movement. Further, less than all four of the arms will make engagement with the slot of the vehicle chassis. Twisting of the body panel will be likely more prevalent because less than four contact points are actually made with the slot of the vehicle chassis. As a result, wear, squeaks, rattles, buzzing, corrosion and loss of elasticity and loss of sealing may result, especially after years of vehicle operation and exposure to vibration and other environmental conditions.

DETAILED DESCRIPTION OF THE PREFERRED EMBODIMENTS

Figure 1:
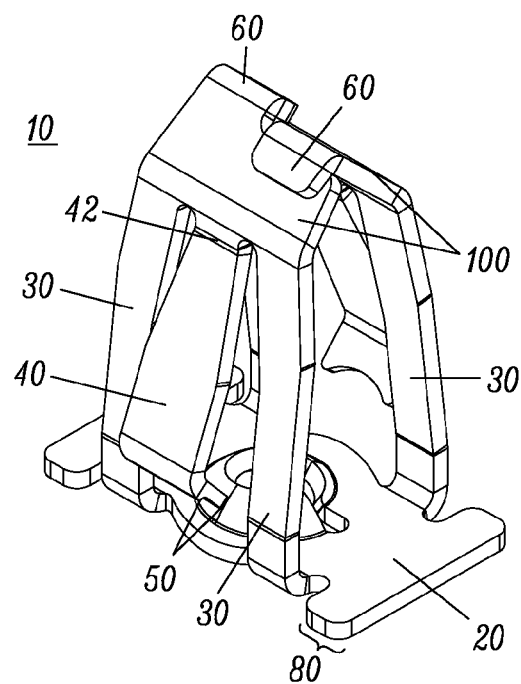
FIG. 1 is a perspective view of a fastener clip according to one embodiment.

A fastener clip includes a base plate and a first and second pair of laterally offset legs extending from the base plate. At least one first wing extends from the first pair of laterally offset legs. The at least one first wing has an engagement region. At least one second wing extends from the second pair of laterally offset legs. The at least one second wing also has an engagement region. The engagement regions include a depressed portion operable to adapt to variations or movement of a slot.

Among other advantages, the fastener clip has a high level of extraction force yet securely and relatively easily facilitates attachment of a body panel, such as an interior or exterior body panel with the first engagement structure such as the vehicle chassis. The fastener clip is suitable for use in heavy duty applications such as visor mounting, headliners and pull-handle fasteners. The wings have an engagement region, size, such as a width, length, thickness and pivot point to provide very high extraction force levels while the insertion force level is relatively low.

Further, the same fastener clip may be used with different sheet metal thicknesses and curvatures. For example, a vehicle may have different sheet metal thicknesses at various parts of the vehicle. The range of slot thicknesses varies continuously from a minimum thickness to a maximum thickness. For example, the minimum thickness may be 0.25 mm or less and the maximum thickness may be 6.0 mm or more. The fastener clip is operative for insertion into the slot defined in a first engagement structure, such as a vehicle chassis. Since the fastener clip adapts automatically to different sheet metal thicknesses and curvatures, the same fastener clip may be used throughout the vehicle thus eliminating the need for specific fastener clips for specific slot thicknesses.

The engagement portion adapts to variations, curvature or movement of slot, such as a sheet metal thicknesses, such as variations in the thickness of various portions of the vehicle chassis and variations in body panels to maintain a high level of extraction force relative to the insertion force. For example, during engagement the engagement portion continuously adapts to variations in thickness, curvature and dimensions of the vehicle chassis and/or in the body panel and other variations. Thus, only a single fastener clip may be used with a vehicle or application even if the thickness of the sheet metal varies or if the sheet metal moves or curves. According to one embodiment, each wing independently engages the slot of the vehicle chassis in a continuous rather than discrete manner. Further, each wing adapts to changes, such as chassis flexing and vibrations of a wide range of amplitudes and frequencies, and other conditions.

The engagement portion, along with an optional engagement tab on each wing, permits relatively easy insertion of the fastener clip into a slot formed within the vehicle chassis while providing a relatively high level of extraction force from the vehicle chassis. Assembly of the body panel onto the vehicle chassis requires a relatively low level of insertion force compared to the extraction force, and as a result provides many ergonomic advantages. For example, the relatively low level of insertion force is particularly advantageous for assembly line operators who repetitively insert body panels onto the vehicle chassis. The relatively low level of insertion force required for inserting the body panel into the vehicle chassis may result in fewer injuries to the assembly workers, including injuries related to repetitive stress syndrome. By eliminating conventional screws for fastening to the roof, assembly of the visor and headliner to the roof with the fastener significantly reduces assembly and servicing time and cost. Further by eliminating multiple fasteners for different sheet metal thicknesses, confusion during assembly is eliminated reduced since the same type fastener may be used for all slots. Thus, an assembly worker need not worry about selecting the wrong fastener for different slot thicknesses.

The relatively high level of extraction force, characteristic of the fastener clip, securely attaches the body panel, such as an interior trim piece or headliner, to the vehicle chassis such as a roof. Further, the fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals or metal to plastic with respect to the vehicle chassis components and/or between plastic components such as the interior trim panels attached to the metal vehicle chassis. Yet another advantage is that the fastener clip is relatively easy to manufacture using relatively inexpensive manufacturing processes and materials. The use of the fastener clip decreases production costs, increases worker productivity and efficiency and decreases overall vehicle assembly costs. The fastener clip securely attaches any suitable body panel to the vehicle chassis, such that the fastener clip improves reliability both in the short term and in the long term, while further improving vehicle safety and quality.

The fastener clip dampens vibrations and thus eliminates or substantially reduces buzz, squeak and rattles. The fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals with respect to the vehicle chassis components and/or between plastic components such as the interior trim panels attached to the metal vehicle chassis. The fastener clip may also fasten to plastic and/or metal engagement structures. The fastener clip and carrier may be made of anti-corrosive material such as plastic or treated metal to provide long reliable service life.

FIG. 1 is a perspective view of a fastener clip 10 according to one embodiment. The fastener clip 10 includes a base plate 20 and a first and second pair of laterally offset legs 30 extending from the base plate 20. At least one first wing 40 extends from the first pair of laterally offset legs 30. The at least one first wing 40 has an engagement region 50. At least one second wing 40 extends from the second pair of laterally offset legs 30. The at least one first wing 40 extends from (are attached to) the first pair of laterally offset legs 30 near the joined portion 100 opposite from the base plate 20. Similarly, the at least one second wing 40 extends from (are attached to) the second pair of laterally offset legs 30 near the joined portion 100 opposite from the base plate 20.

Although reference number 30 refers to both pairs of legs and reference number 40 refers to wings 40 on both pairs of legs 30, it is understood that the at least one first wing 40 corresponds to the first pair of legs 30 and the at least one second wing 40 corresponds to the second pair of legs 30. Although the fastener clip 10 is shown in FIGS. 1-13 with four legs 30 and two wings 40, any suitable number of legs 30 and wings 40 may be used. For example, two legs 30 and two wings 40 may be used, two legs 30 and four wings 40 may be used, three legs 30, four legs 30 an so forth may be used. According to one embodiment, the legs 30 and arms 30 may have any suitable shape, such as for example, at least one of: the legs and the arms, is tapered, straight, curved or any suitable shape.

The wings 40 have a size, such as a width, length, thickness and a pivot point 42 to provide very high extraction force levels while the insertion force level is relatively very low. For example, the pivot point 42 may be weakened by scoring, stamping, bending, cutting or any suitable means on wing 40 to ensure that the wings 40 spring inward as required so that the insertion force is low relative to the extraction force. Since the wings 40 are in compression during extraction, the weakened pivot point 42 does not significantly weaken the extraction force yet the insertion force is reduced. Additionally, the width of the wing 40 may be increased (FIGS. 7-13) to further increase the strength of the wing and thus increase the extraction force, as well as increase the size of the engagement region. Alternatively, the width of the wing may be decreased, or the wings may have different widths and engagement regions 50 to achieve any desired insertion force, extraction force or ratio.

Figure 2:
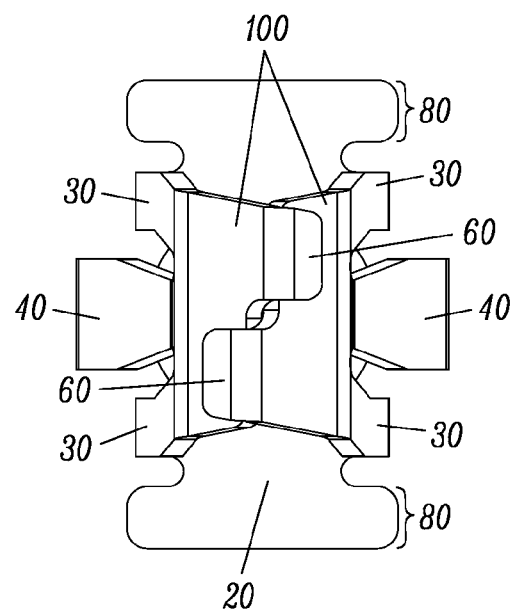
FIG. 2 is a top view of the fastener clip according to another embodiment.

FIG. 2 is a top view of the fastener clip 10 according to another embodiment. First locking tabs 60 are on the first pair of laterally offset legs 30 at an end opposed the base plate 20. Similarly, second locking tabs 60 are on the second pair of laterally offset legs 30 at an end opposed the base plate 20. For example, the locking tabs 60 touch or are close together to prevent or reduce movement between the pair of legs 30 and strengthen the fastener clip 10 to improve engagement.

Figure 3:
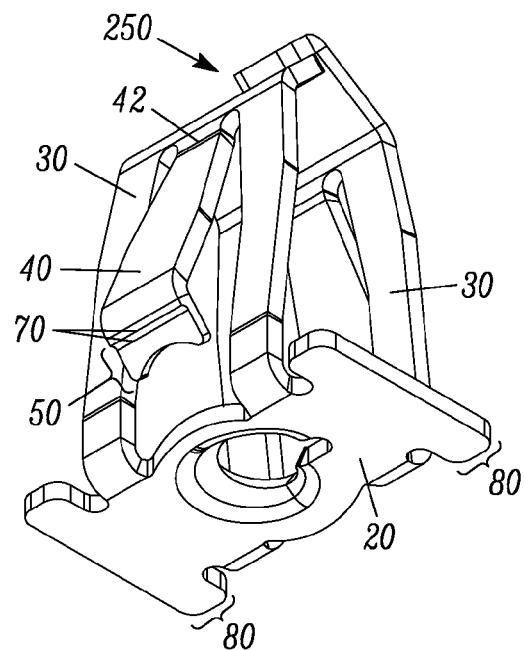
FIG. 3 is a bottom perspective view of the fastener clip according to another embodiment.

FIG. 3 is a bottom perspective view of the fastener clip 10 according to another embodiment. The at least one first and second wing 40 has an engagement region 50. According to one embodiment, the engagement region 50 includes a depressed portion 70 formed on each wing 40, such that each depressed portion 70 is operative to engage at least a portion of the slot 640 defined in the first engagement structure 630 (FIG. 6) and is operable to adapt to variations or movement of slot 640. According to the embodiment shown, each of the pair of laterally offset arms 30 is coupled to the wings 40 at a distal end 250 (i.e. distal relative to and opposite the base plate 20). According to this embodiment, the wings 40 extend inwardly toward the base plate 20. Alternatively, the wings 40 could be coupled at or near the base plate 20 extending toward the distal end 250.

According to one embodiment, legs 30 are coupled via a joined portion 100 at a distant portion 250 away and opposite from the base plate 20. For example, the joined portion 100 may provide a guide for inserting the fastener clip 10 into the slot 640 of the first engagement structure 630, such as a roof, during assembly.

Figure 3A:
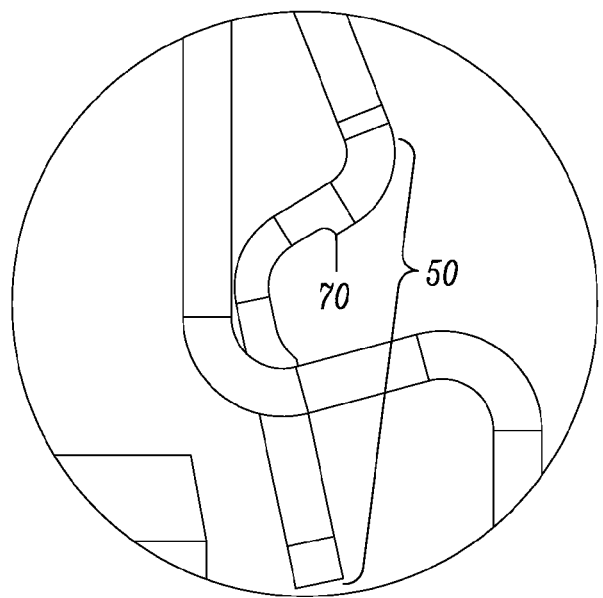
FIG. 3A shows more detail for the engagement region according to one embodiment.

FIG. 3A shows more detail for the engagement region 50 and the depressed portion 70 according to one embodiment. According to one embodiment, the depressed portion 70 may be a depression formed on wings 40. For example, the depressed portion 70 may be manufactured by stamping a step or ridge on wings 40 to form the depressed portion 70. The size, dimensions and shape of the depressed portion 70 may be formed in any suitable manner in order to permit relatively easy insertion of the fastener clip 10 into the first engagement structure 630 while increasing the extraction force.

The depressed portion 70 may include, for example, an abrupt edge, a gradual angled edge such as a curve, a single angled edge, a discrete multi-angled edge and a pointed edge or any suitable edge. For example, the depressed portion 70 may be stamped, cut, molded, etched (i.e. chemical, laser, or knife etching for example) or formed in any suitable manner such that a protrusion, prong, edge, rounded, bulbous, stepped, angled, and depressed or other suitable shape is formed for example in a non-planar orientation relative to an end of the wings 40. The depressed portion 70 is formed on the engagement portion 50 of each wing 40 so as to engage or "catch" slot 640 (FIG. 6) to increase an extraction force for the fastener clip 10 when removed from the slot 640 formed on the first engagement structure 630. The depressed portion 70 and/or the engagement portion 50 may be sized to suitably engage slot rim 650 of the first engagement structure 630 in order to obtain the desired level of extraction force.

During insertion, the engagement force between fastener clip 10 and first engagement structure 630 may be, less than the extraction force. According to one exemplary embodiment, during insertion, the coupling force between fastener clip 10 and first engagement structure 630 may be, for example, about 5 to 15 lbs. or less, while the extraction force may be about 20 to 50 lbs. or more. According to another exemplary embodiment, the insertion force is between 5 to 30 lbs. or less, while the extraction force may be about 200 to 400 lbs. or more. Any other suitable amount or range of insertion and extraction force for an appropriate application is contemplated. For example, the amount of insertion and extraction force for any application, large or small would require corresponding appropriate sized and characteristics of the engagement portion 50 described herein. In another applications, such as in a visor mount, the extraction force may be over 100 lbs, such as 200, 300, even 400 lbs. or more. According to one embodiment, each of the wings 40 are formed with engagement portions 230 having different characteristics according to the different requirements for engagement of each wing 40.

According to one embodiment, any part of the depressed portion 70 of the wing 40 engages the slot rim 650 formed by the slot 640 within the first engagement structure 630. The depressed portion 70 may further include characteristics such as an edge formed to include either a single curvature or multiple curvatures to engage the rim 650. The amount of curvature, the depth of the depression, the width of the depression and the number of depressions may be sized in order to provide the desired level of extraction force due to the frictional engagement between any portion of the depressed portion 70 and the rim 650 of the first engagement structure 630.

According to one embodiment, the depressed portion 70 may also include protrusions, cuts, points, curves, prongs, ribs, teeth and/or steps or any other suitable structure at any suitable location to frictionally engage the first engagement structure 630. For example, such structure may be formed on an edge of the depressed portion 70 for complementary engagement with the first engagement structure 630. The depressed portion 70 may form edges of any angle or curvature, such as, for example, zero degrees, 30 degrees, 45 degrees, 60 degrees, 90 degrees, 145 degrees and so on. For example, any part of the depressed portion 70 may continuously and frictionally engage the rim 650 with sufficient springing force in order to compensate for and automatically adapt to both production tolerances within the slot 640 of the first engagement structure 630, the body panel 610, the second engagement structure 40 and also to compensate for thermal expansion, vibrations and other environmental conditions over very long periods of time. For example, if the body panel assembly 10 is subject to vibrations, rattles or otherwise moves relative to the second engagement structure 40, the frictional engagement between the depressed portion 70 and the rim 650 may continuously move or change while maintaining frictional engagement either continuously or discretely, and thus adapt to and dampen or prevent any resulting movement. As a result, fastener clip 10 may reliably attach the second engagement structure 40 to the first engagement structure 630 via a secure coupling over long periods of time and under varying conditions.

According to one embodiment, the depressed portion 70 includes a dimple or suitable depression formed by including a gap between one or more stampings so that the depressed portion 70 includes a dimple or lip for further increasing the frictional engagement with the first engagement structure 630. Alternatively, the depressed portion 70 may include two or more consecutive or alternating curved depressions.

Figure 4:
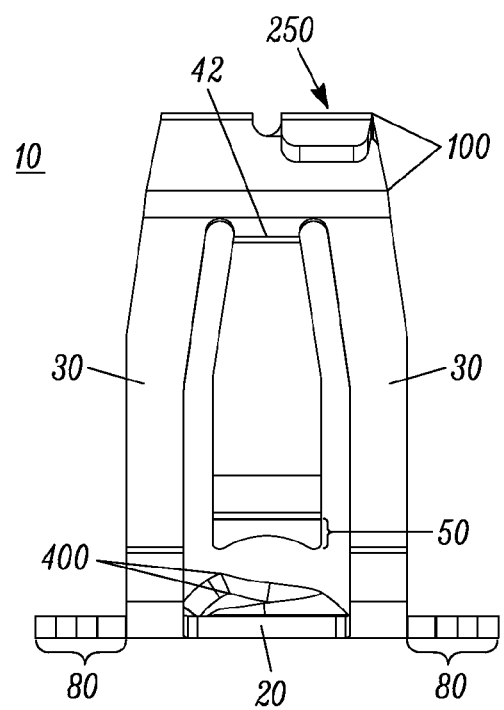
FIG. 4 is a side view of the fastener clip according to one embodiment.

FIG. 4 is a side view of the fastener clip 10 according to one embodiment. According to this embodiment, the fastener clip 10 comprises end brackets 80 at opposite ends of the base plate.

Figure 5:
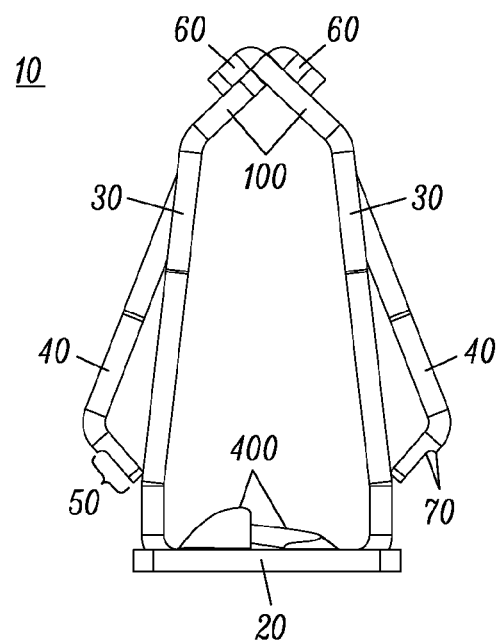
FIG. 5 is another side view of the fastener clip shown in FIG. 4 rotated 90 degrees.

FIG. 5 is another side view of the fastener clip 10 shown in FIG. 4 rotated 90 degrees. At least two threading projections 400 protrude from the base plate 20, such that the at least two threading projections 400 point to each other to create a frictional opening 410. According to one embodiment, the fastener clip 10 further includes a side wing to engage a narrow edge of the slot wherein the optional engagement regions 50 on the first and second wings 40 engage a relatively wide edge of the slot.

Figure 6:
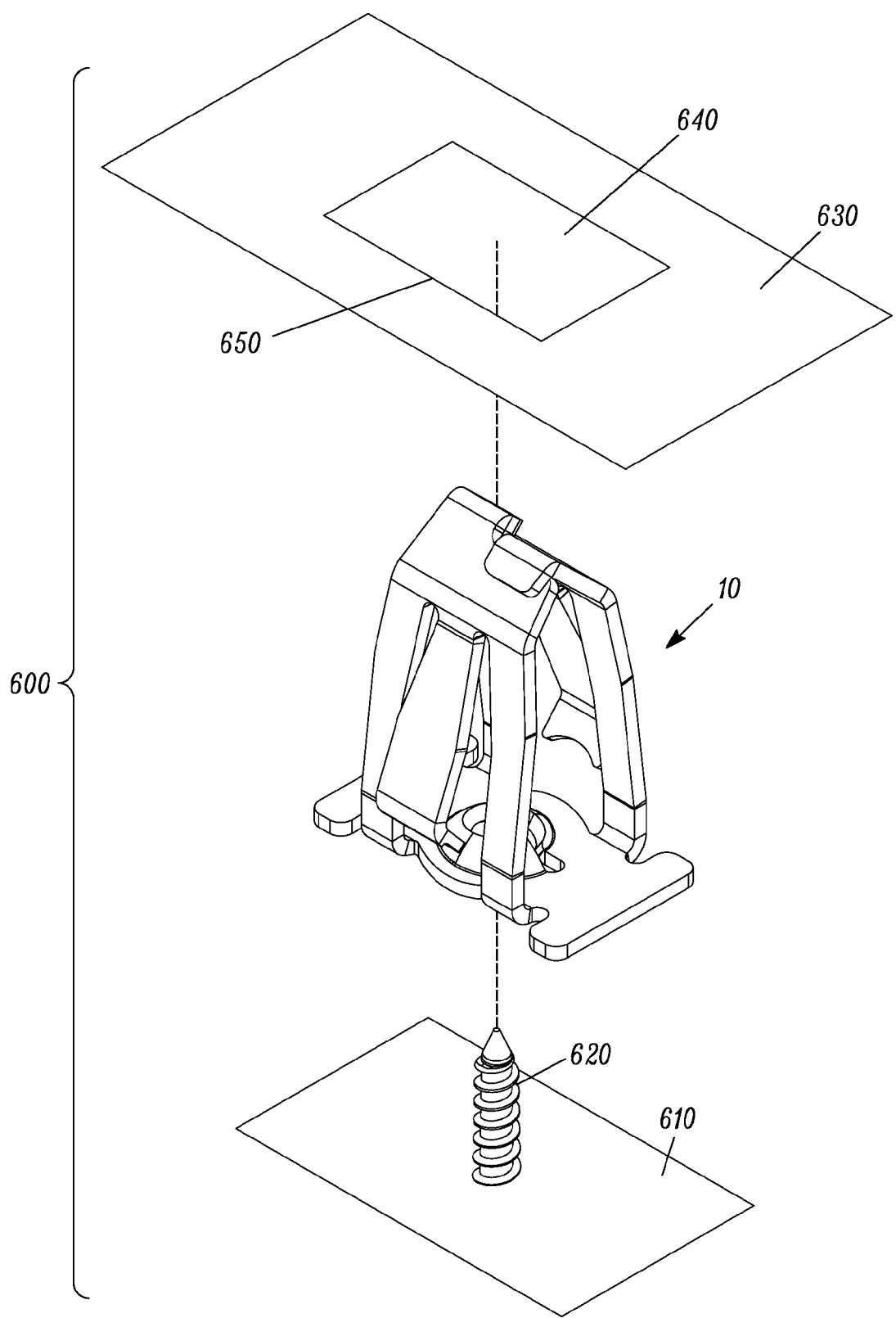
FIG. 6 is a perspective view of a body panel assembly according to one embodiment.
Figure 7:
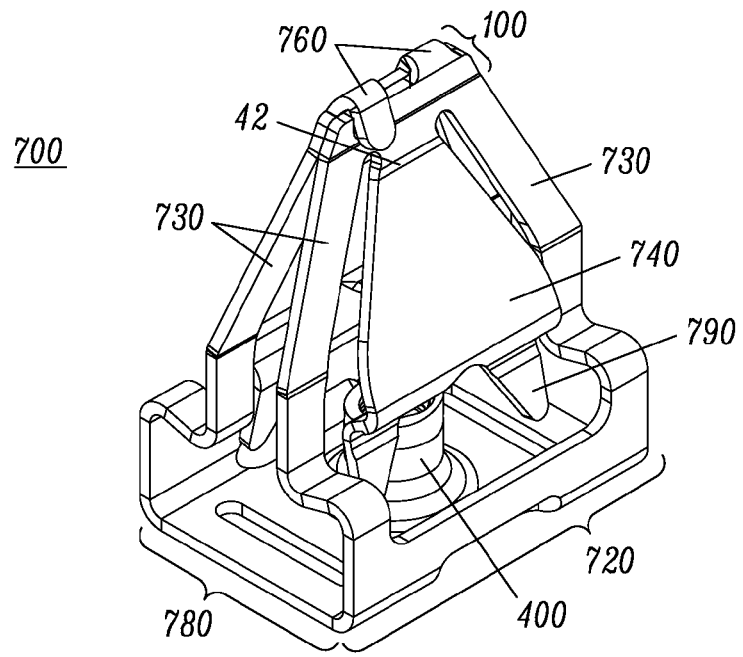
FIG. 7 is a perspective view of a fastener clip in accordance with another embodiment.
Figure 8:
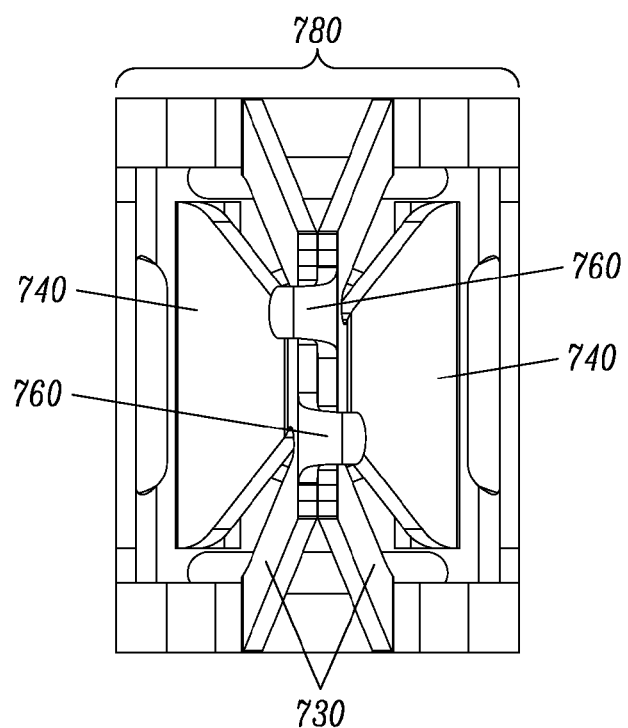
FIG. 8 is a top view of the fastener shown in FIG. 7.
Figure 9:
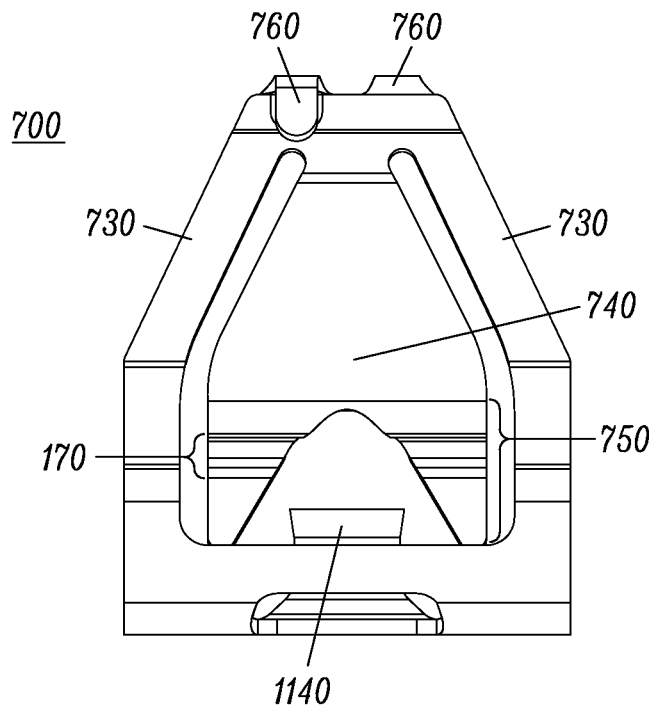
FIG. 9 is a side view of a fastener clip in accordance with an exemplary embodiment.
Figure 10:
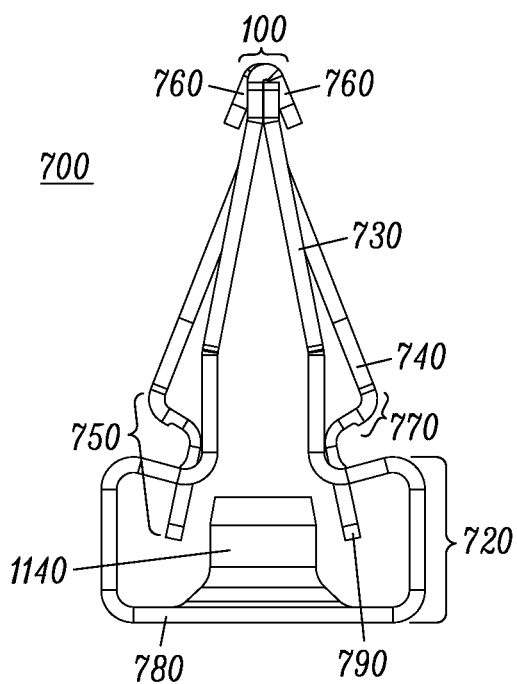
FIG. 10 is another side view of the fastener clip shown in FIG. 9 rotated 90 degrees.

FIG. 6 is a perspective view of a body panel assembly 600 according to one embodiment. The body panel assembly 600 comprises a body panel 610, such as a headliner and visor mounting assembly having a mounting member and fastener such as a screw, bolt, rivet or any suitable fastener 620 to engage the fastener clip 10. The fastener clip 10 is operatively inserted into a slot 640 defined in a first engagement structure 630, such as a vehicle chassis or frame. The fastener clip 10 optionally adapts to different frame 630 thicknesses and curvatures such that a distance between the engagement regions 50 and the base plate 20 is operative to vary continuously according to a slot 640 thicknesses.

According to one embodiment, the fastener clip 10 is made of: steel, tin aluminum, magnesium, copper, carbon fiber or any suitable metal or alloy. According to another embodiment, the fastener clip 10 is made of: plastic, acetal, polyacetal, polyoxymethylene, nylon, fiberglass, Acrylonitrile butadiene styrene (ABS), and/or carbon fiber, however any suitable material may be used in any combination such as steel, tin and/or any suitable metal. According to an alternative embodiment, a coating is applied on the fastener clip made of at least one of: nickel plating, zinc plating, rubber, plastisol, plastic, acetal, polyacetal, polyoxymethylene, nylon, fiberglass and/or carbon fiber to suitably provide corrosion resistance and to reduce rattling.

The body panel 610, such as a visor bracket and headliner, may be constructed from plastic or from any suitable material such as wood, steel, aluminum, magnesium, wood, plastic, fiber glass, carbon fiber or any suitable material.

FIGS. 7-11 are various views of a fastener clip 700 in accordance with another embodiment. Although this embodiment is in general similar to the clips shown in FIGS. 1-6, different reference numbers are provided although the previous relevant descriptions apply. The fastener clip 700 includes a base plate 720 and a first and second pair of laterally offset legs 730 extending from the base plate 720. At least one first wing 740 extends from the first pair of laterally offset legs 730. The at least one first and second wing 740 has an engagement region 750 and depressed portion 770. At least one second wing 740 extends from the second pair of laterally offset legs 730. First locking tabs 760 are on the first pair of laterally offset legs 730 at an end opposed the base plate 720. Similarly, second locking tabs 760 are on the second pair of laterally offset legs 730 at an end opposed the base plate 720. According to one embodiment, at least one of the wings 740 include a removal tab 790 at the end of wings 740. The at least one removal tab 790 permits easy removal of the clip 700 by squeezing or compressing at least one of the removal tabs 790 thus countering the expansion-spring force on the wings 740 and thus releasing the engagement portions 50 from the slot 640.

Figure 11:
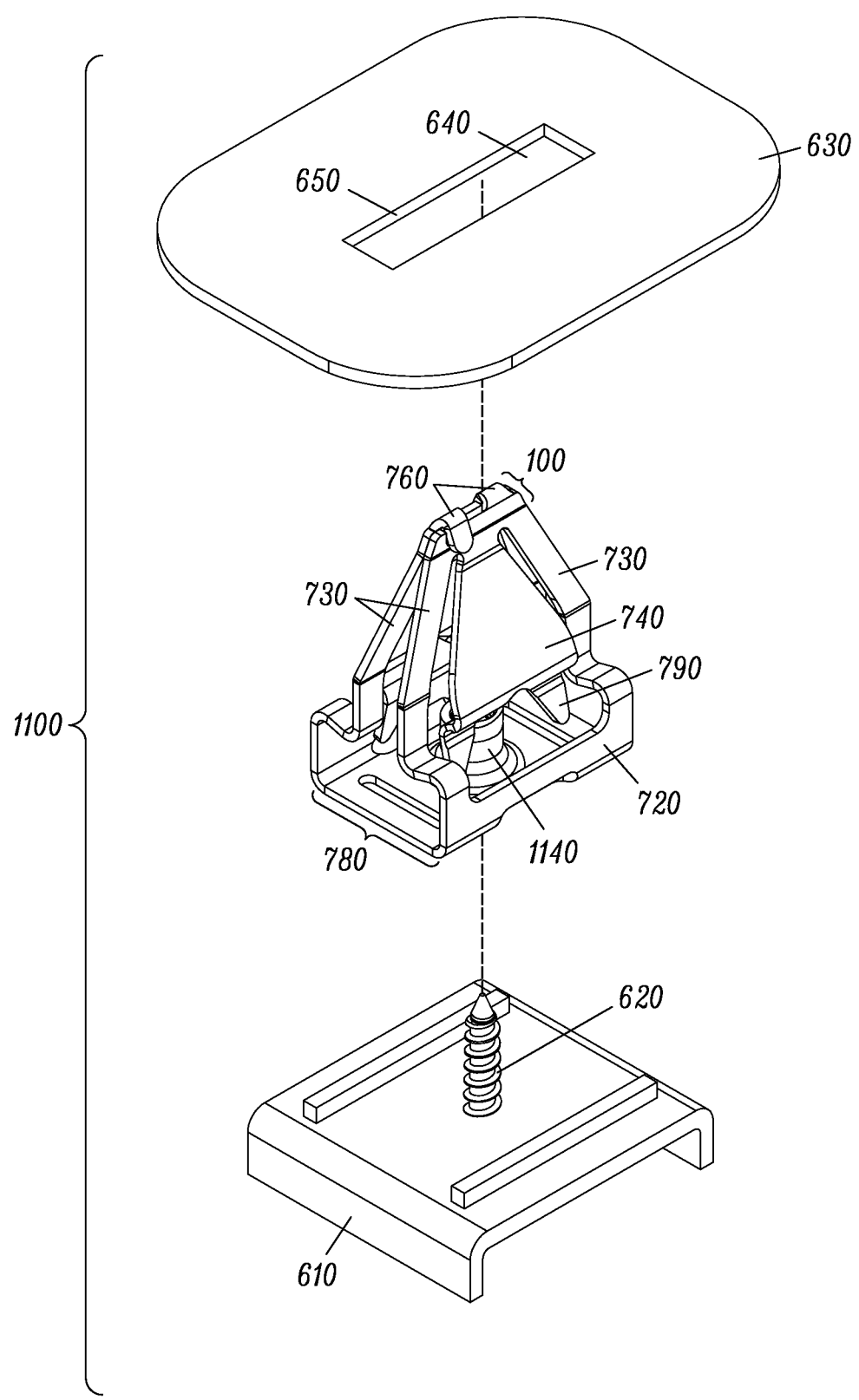
FIG. 11 is an exploded view of a body panel assembly according to one embodiment.

FIG. 11 is a perspective view of a body panel assembly 1100 according to one embodiment. The body panel assembly 1100 comprises a body panel 610, such as a headliner and visor mounting assembly having a fastener such as a screw, bolt, rivet or any suitable fastener 620 to engage threading projections 1140 on the fastener clip 10. The fastener clip 700, 10 is operatively inserted into a slot 640 defined in a first engagement structure 630, such as a vehicle chassis or frame.

Figure 12:
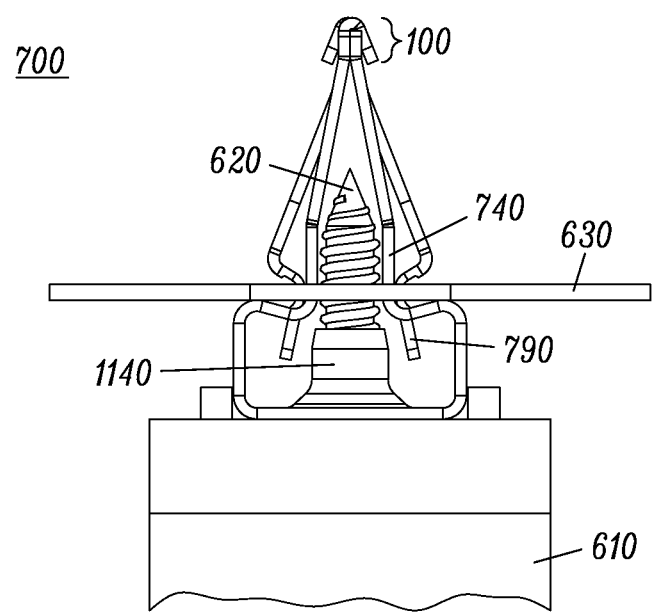
FIG. 12 is a side view of the fastener clip prior affixed to a frame.

FIG. 12 is a side view of the fastener clip 700 prior to being affixed to a first engagement structure 630. The joined portion 100 may provide a guide for inserting the fastener clip 700 into the slot 640 of the first engagement structure 630, such as a roof or vehicle chassis, during assembly.

Figure 13:
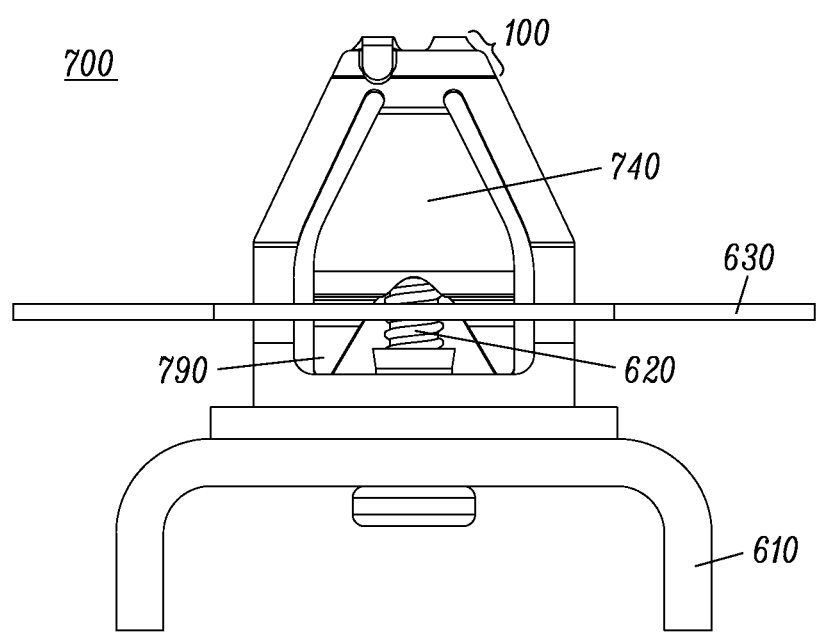
FIG. 13 is a side view of the fastener clip affixed to a frame as shown in FIG. 12 rotated 90 degrees in accordance with an exemplary embodiment.

FIG. 13 is a side view of the fastener clip 700 affixed to an engagement structure 630 as shown in FIG. 12 rotated 90 degrees in accordance with an exemplary embodiment. The fastener clip 700 optionally adapts to different frame 630 thicknesses such that a distance between the engagement regions 750 and the base plate 720 is operative to vary continuously according to a slot 640 thicknesses.

Figure 14:
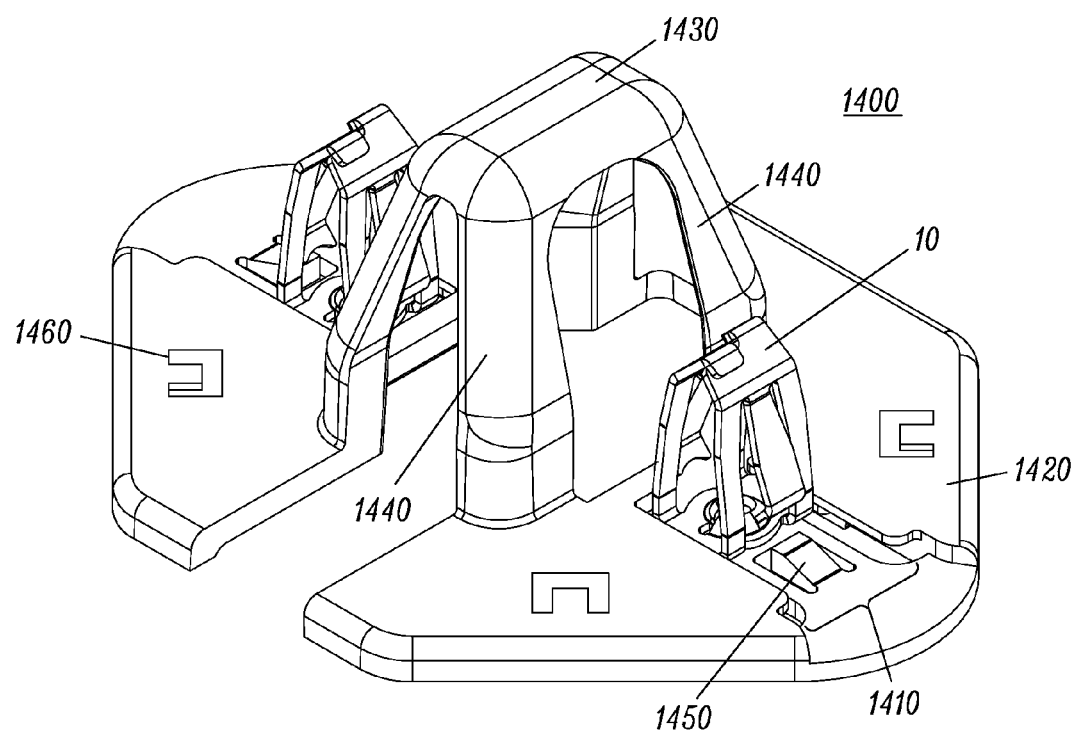
FIG. 14 is a perspective view of a carrier assembly according to one embodiment.

FIG. 14 is a perspective view of a carrier assembly 1400 according to one embodiment. The carrier 1400 includes at least one carrier 1410 formed into a carrier base 1420. A first pair of laterally offset legs 1440 extend from the carrier base 1420 and a second pair of laterally offset legs 1440 extend from the carrier base 1420. According to one embodiment the first and second pair of laterally offset legs 1440 form a dome 1430 opposite the carrier base 1420.

Figure 15:
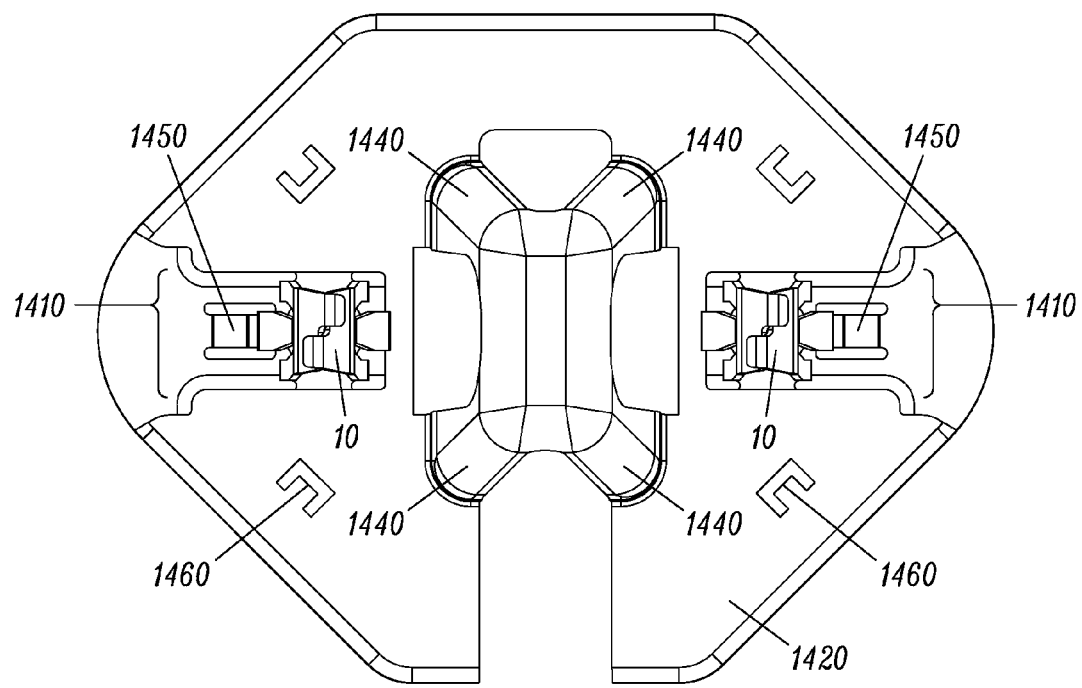
FIG. 15 is a top view of a carrier assembly according to one embodiment.

FIG. 15 is a top view of a carrier assembly 1400 according to one embodiment. According to one embodiment the carrier 1420 includes a spring finger 1450 suitable to retain the fastener 10 in the carrier base 1420, by for example sliding the fastener 10 unit it clicks in. For example, the spring finger 1450 may be formed in the carrier base 1420 via injection molding either with or without action.

Figure 16:
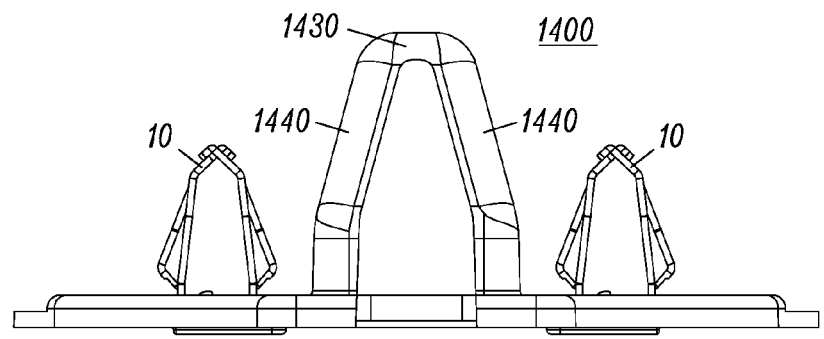
FIG. 16 is a side view of a carrier assembly according to one embodiment.
Figure 19:
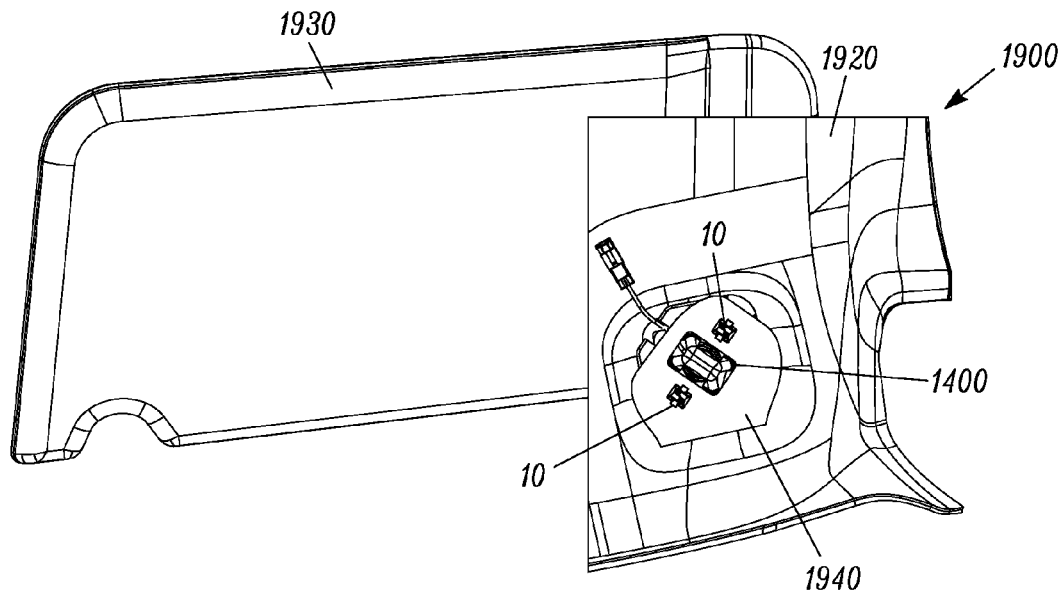
FIGS. 19 through 21 illustrate various views of a visor assembly according to one embodiment.

FIG. 16 is a side view of a carrier assembly 1400 according to one embodiment. For example, the carrier assembly 1400 may be pre-assembled with fasteners 10 and delivered to an assembler of the visor or headliner assembly. Thus, the assembler of the visor or headliner assembly simply attaches the carrier assembly 1400 by pushing it into the visor 1930 (FIG. 19). Optionally, as described herein, the carrier assembly 1400 may attach the visor 1930 to the headliner 1920 to form a headliner assembly ready for attachment to the roof 1940 during final vehicle assembly by pushing the carrier assembly 1400 on the headliner 1920 into the roof 1940.

Figure 17:
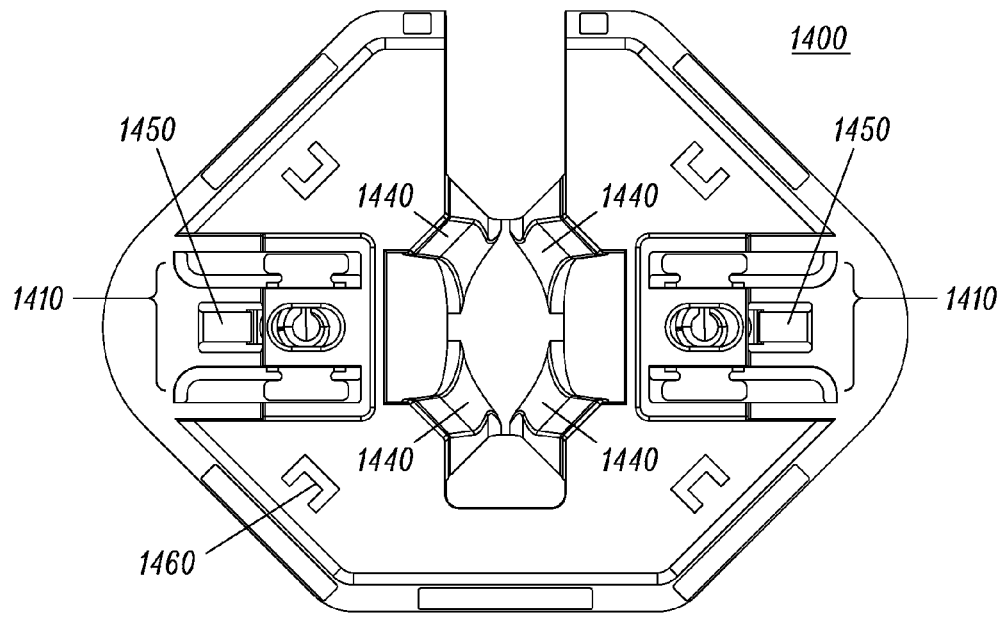
FIG. 17 is a bottom view of a carrier assembly according to one embodiment.
Figure 18:
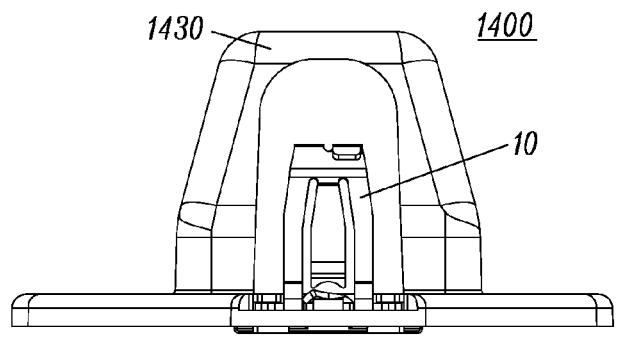
FIG. 18 is a side view of a carrier assembly shown in FIG. 16 rotated 90 degrees according to one embodiment.

FIG. 17 is a bottom view of a carrier assembly 1400 according to one embodiment. FIG. 18 is a side view of a carrier assembly 1400 shown in FIG. 16 rotated 90 degrees according to one embodiment. Carrier base 1420 optionally includes spring finger tabs 1460 suitable to provide pressure between the carrier 1400 and the roof 1940 to reduce rattling. Spring finger tabs 1460 may be projections molded (with or without multiple step molding action) into the carrier base 1420 at a height suitable to provide a springing force against the roof 1940.

Figure 20:
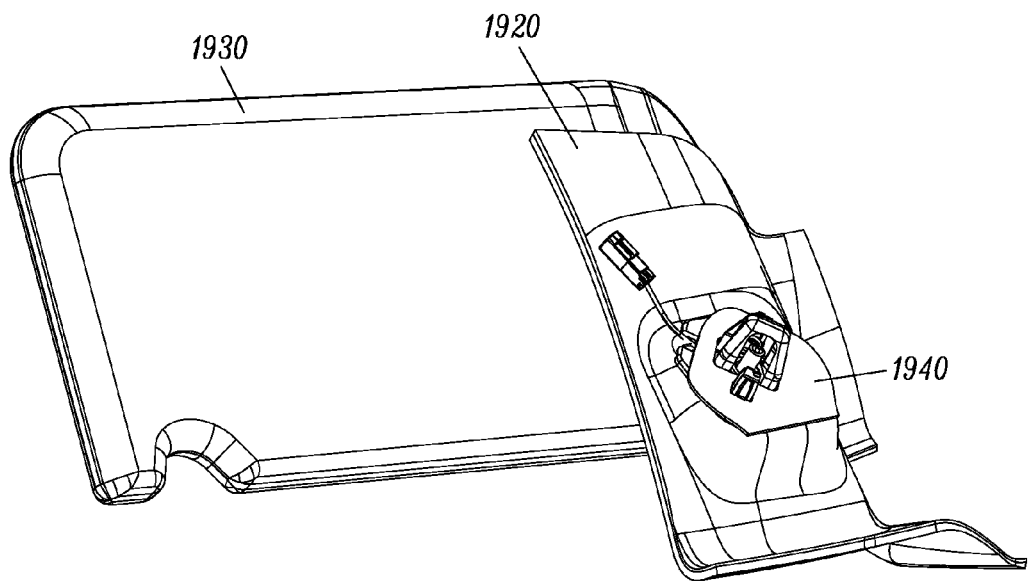
Figure 21:
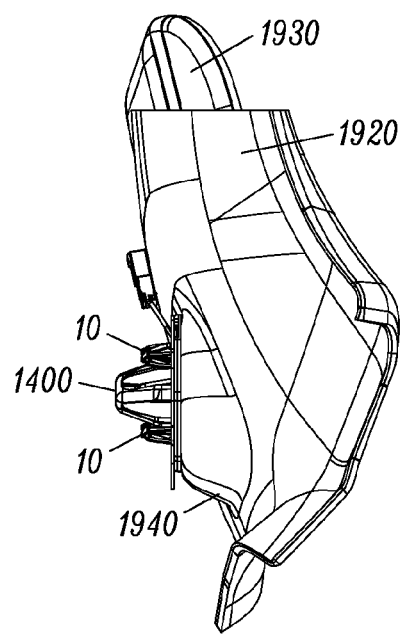
Figure 22:
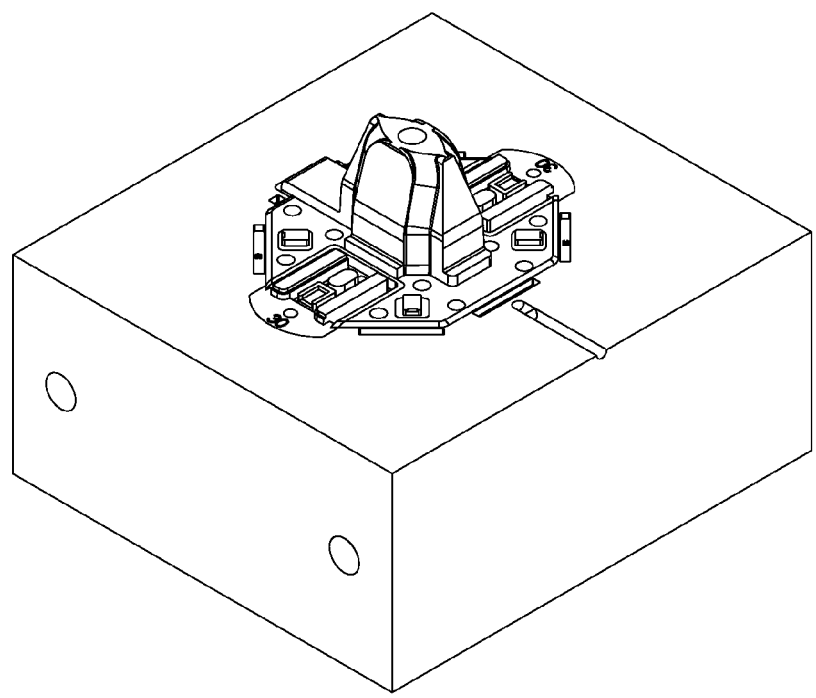
FIGS. 22 through 29 illustrate various views of injection molds suitable for manufacturing the carrier according to one embodiment.
Figure 23:
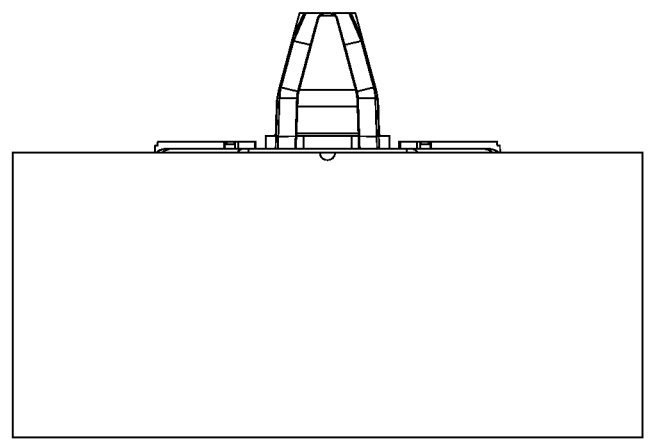
Figure 24:
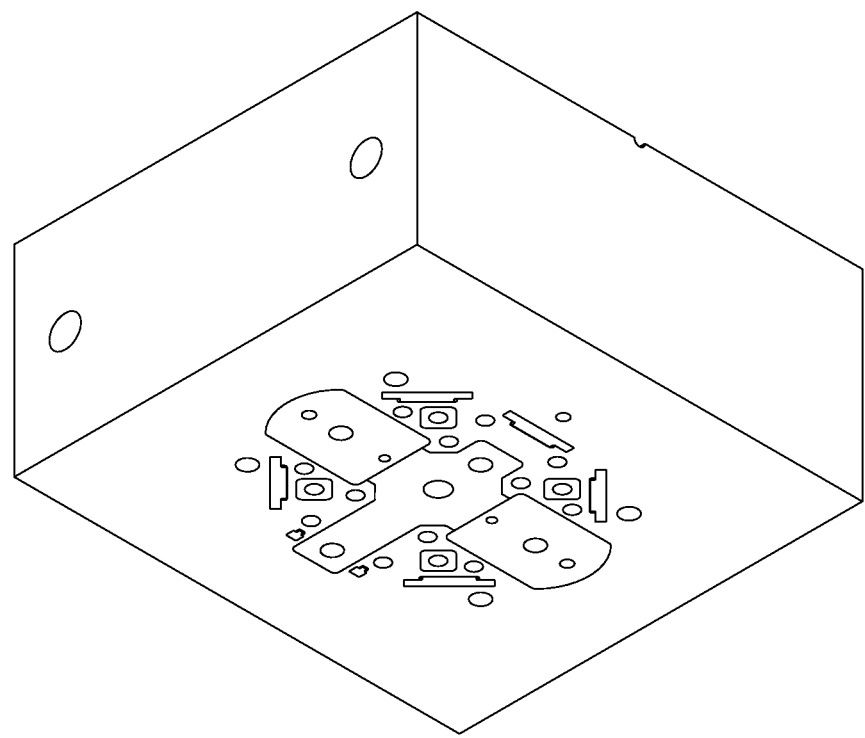
Figure 25:
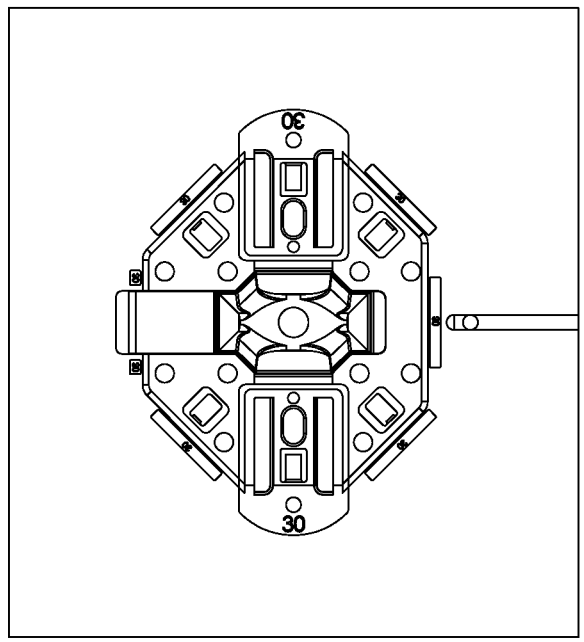
Figure 26:
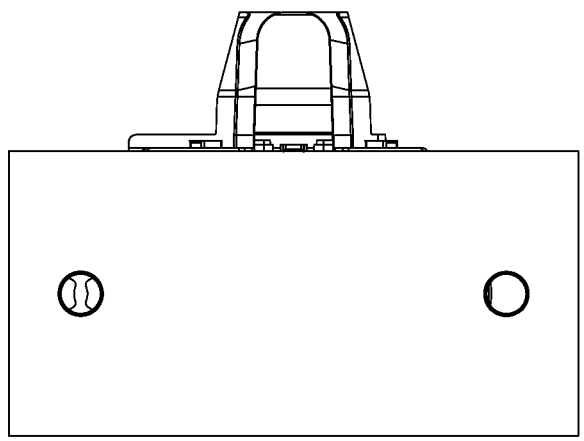
Figure 27:
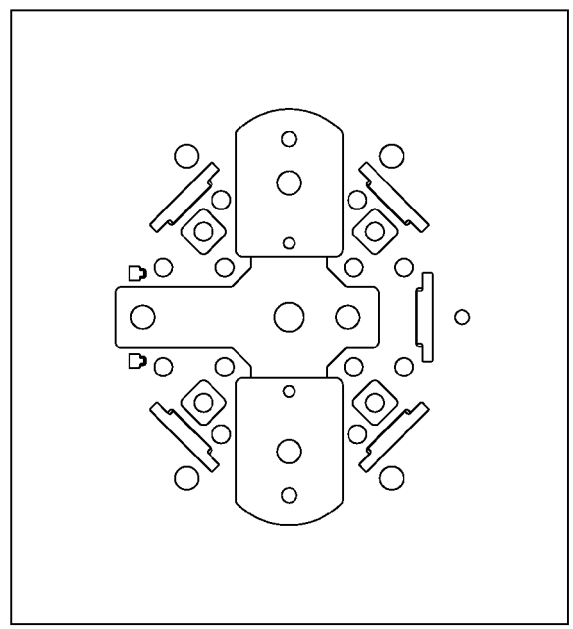
Figure 28:
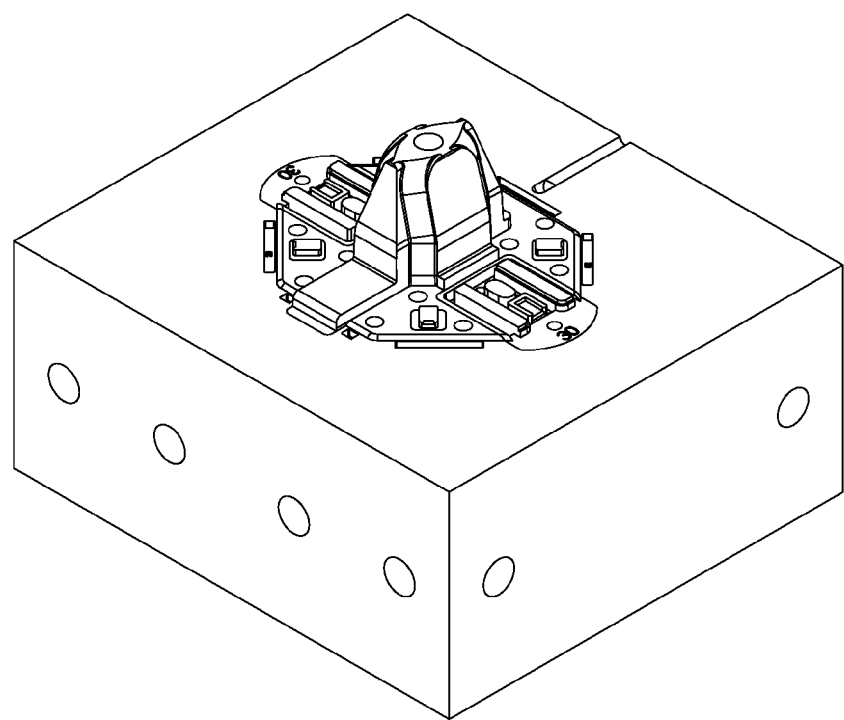
Figure 29:
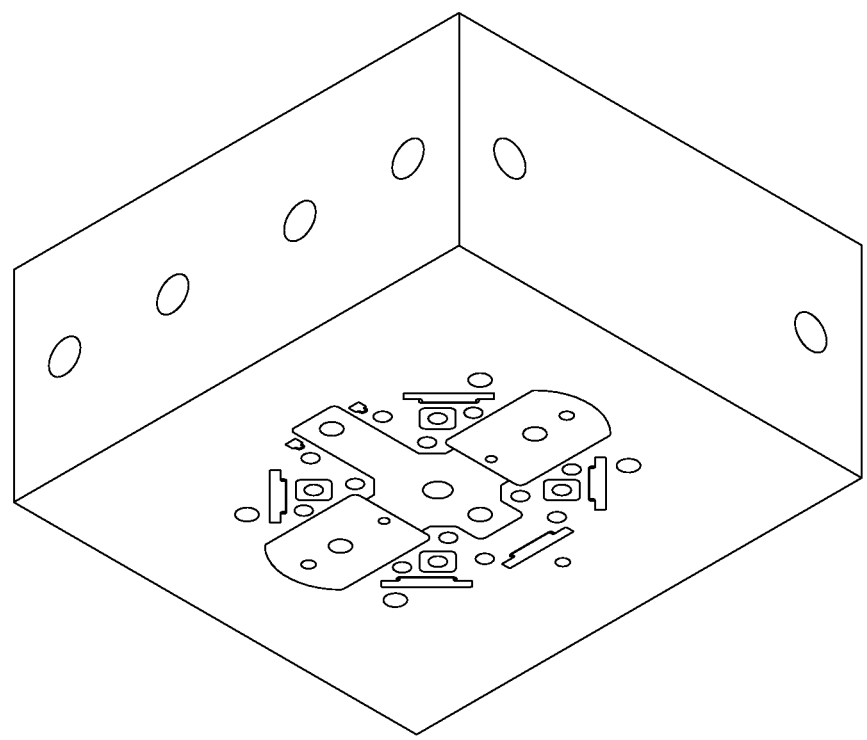

FIGS. 19 through 21 illustrate a partial visor assembly 1900 according to one embodiment. The visor assembly 1900 includes the carrier assembly 1400 and may also include a headliner 1920, visor 1930, optional spring or other suitable device to cooperate with the visor rod to allow the visor 1930 to be oriented as desired. The visor 1930 may be attached to the carrier 1400 via screw 620 attaching the visor 1930 or suitable visor bracket and also the headliner (610) and the threaded projections 400 of fastener 10, 700. The visor assembly 1900 may include a visor rod and torque control (not shown) within the visor body for allowing the visor 1900 to be held in a particular position and to rotate downwardly to a desired adjusted position. The visor rod may be generally L-shaped extending upwardly within the dome 1430 in the carrier assembly 1400 which is attached to the vehicle roof 1940 by at least one fastener 10. Although two fasteners 10, 700 are shown on carrier 1400 any suitable number of fasteners may be used such as 1, 2, 3, 4, 5, 6, 7, 8 and so forth. The visor assembly 1900 can be used on either or both driver and passenger sides. The specific operation of the visor pivot rod and torque control internal to the visor body are not shown.

For example, the carrier assembly 1400 may be secured to the vehicle roof 1940 by a pair of fasteners 10, 700 on opposite sides of the carrier assembly 1400. Thus, the carrier assembly 1400 may attach the visor 1930 to the headliner 1920 to form a headliner assembly ready for attachment to the roof 1940 during final vehicle assembly.

Many vehicles now include side curtain air bags, which are mounted optionally in the headliner 1920 in the area above and adjacent side window for example. However, for such a configuration there is the possibility that the visor 1930 could be in a position causing the air bag to be blocked or otherwise block or interfere with operation of the airbag. The visor assembly 1900 prevents or reduces such blocking or interference with the air bag and otherwise withstands or directs the force of air bag deployment. For example, the fastener 10, 700 may provide sufficient extraction force to prevent or reduce disengagement during deployment of the air bag. As a result, fastener 10, 700 may replace screws or other fasteners for fastening the headliner and visor assembly 1900 to the roof 1940 to provide the requisite high level of extraction force while significantly reducing assembly and servicing time and cost.

FIGS. 22 through 29 illustrate various views of injection molds suitable for manufacturing carrier 1400 in an injection molding process according to one embodiment. According to one embodiment, a two piece mold is used, although any suitable number of molds may be used. Carrier assembly 1400, headliner 1920, visor 1930 or any combination of components may be made from: Polypropylene, glass fill, acetal, plastic, vinyl, rubber, plastisol, plastic, acetal, polyacetal, polyoxymethylene, nylon, any suitable polymeric material, polycarbonate, thermoplastic resin, fiberglass and carbon fiber and Acrylonitrile butadiene styrene (ABS), or any suitable material and combination thereof suitable for injection molding.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A fastener clip comprising:
    a base plate;
    a first pair of laterally offset legs extending from the base plate;
        at least one first wing extending from the first pair of laterally offset legs, the at least one first wing having an engagement region;
    a second pair of laterally offset legs extending from the base plate,
        a first locking tab on the first pair of laterally offset legs interlocking with the second pair of laterally offset legs at a joined portion at an end opposed the base plate;
        a second locking tab on the second pair of laterally offset legs interlocking with the first pair of laterally offset legs at a joined portion at an end opposed the base plate;
        the first and second locking tabs touch one another to reduce movement between the pair of legs; and
        at least one second wing extending from the second pair of laterally offset legs, the at least one second wing having an engagement region, such that the engagement regions include a depressed portion operable to adapt to variations or movement of a slot.

2. The fastener clip of claim 1, wherein the depressed portion further includes at least one of: an abrupt edge, a gradual angled edge, a curve, a single angled edge, a discrete multi-angled edge and a pointed edge.

3. The fastener clip of claim 1, wherein the depressed portion is formed by at least one of: stamping, cutting, molding, and etching.

4. The fastener clip of claim 1, wherein the depressed portion includes at least one of: a protrusion, prong, edge, rounded, bulbous, stepped, angled, dimple, and depression.

5. The fastener clip of claim 1, further comprising end brackets at opposite ends of the base plate.

6. The fastener clip of claim 1 further comprising at least one removal tab at an end of at least one wing.

7. The fastener clip of claim 1, further comprising at least two threading projections protruding from the base plate, such that the at least two threading projections point to each other to create a frictional opening.

8. The fastener clip of claim 1, wherein the first and second wings are wide or narrow.

9. The fastener clip of claim 1, wherein an engagement force is less than an extraction force.

10. The fastener clip of claim 1, further comprising a coating on the fastener clip made of at least one of: rubber, plastisol, plastic, acetal, polyacetal, polyoxymethylene, nylon, fiberglass and carbon fiber.

11. The fastener clip of claim 1, wherein at least one of: the legs and the wings, is tapered.

12. A fastener assembly comprising:
  a body panel comprising a carrier assembly
  a fastener clip comprising:
    a base plate coupled to the carrier assembly;
    a first pair of laterally offset legs extending from the base plate;
      at least one first wing extending from the first pair of laterally offset legs, the at least one first wing having an engagement region; and
    a second pair of laterally offset legs extending from the base plate,
      a first locking tab on the first pair of laterally offset legs interlocking with the second pair of laterally offset legs at a joined portion at an end opposed the base plate;
      a second locking tab on the second pair of laterally offset legs interlocking with the first pair of laterally offset legs at a joined portion at an end opposed the base plate;
      the first and second locking tabs touch one another to reduce movement between the pair of legs; and
    at least one second wing extending from the second pair of laterally offset legs, the at least one second wing having an engagement region, such that the engagement regions include a depressed portion operable to adapt to variations or movement of a slot.

13. The fastener assembly of claim 12, wherein the depressed portion further includes at least one of: an abrupt edge, a gradual angled edge, a curve, a single angled edge, a discrete multi-angled edge and a pointed edge.

14. The fastener assembly of claim 12, wherein the depressed portion includes at least one of: a protrusion, prong, edge, rounded, bulbous, stepped, angled, dimple, and depression.

15. The fastener assembly of claim 12 further comprising end brackets at opposite ends of the base plate.

16. The fastener assembly of claim 12 further comprising at least one removal tab at an end of at least one wing.

17. The fastener assembly of claim 12, further comprising at least two threading projections protruding from the base plate, such that the at least two threading projections point to each other to create a frictional opening and to engage a fastener also engaged to the mounting member.

18. The fastener assembly of claim 12, wherein an engagement force is less than an extraction force.

19. A vehicle comprising:
  a vehicle chassis having a slot;
  a body panel including a carrier assembly;
  a fastener clip comprising:
    a base plate coupled to the a carrier assembly;
    a first pair of laterally offset legs extending from the base plate;
      at least one first wing extending from the first pair of laterally offset legs, the at least one first wing having an engagement region;
    a second pair of laterally offset legs extending from the base plate,
      a first locking tab on the first pair of laterally offset legs interlocking with the second pair of laterally offset legs at a joined portion at an end opposed the base plate;
      a second locking tab on the second pair of laterally offset legs interlocking with the first pair of laterally offset legs at a joined portion at an end opposed the base plate;
      the first and second locking tabs touch one another to reduce movement between the pair of legs; and
    at least one second wing extending from the second pair of laterally offset legs, the at least one second wing having an engagement region, such that the engagement regions include a depressed portion operable to adapt to variations or movement of the slot.

20. The vehicle of claim 19, wherein the depressed portion further includes at least one of: an abrupt edge, a gradual angled edge, a curve, a single angled edge, a discrete multi-angled edge and a pointed edge.

21. The vehicle of claim 19, wherein the depressed portion includes at least one of: a protrusion, prong, edge, rounded, bulbous, stepped, angled, dimple, and depression.

22. The fastener clip of claim 1, wherein the wings extend inwardly from a pivot point while the legs remain coupled at a joined portion such that the joined portion provides a guide for insertion.

* * * * *